United States Patent Office 3,239,545
Patented Mar. 8, 1966

3,239,545
POLYACID AND POLYAMIDE DERIVATIVES OF POLYMERIC FAT ACIDS
Edgar R. Rogier, Hopkins, Minn., assignor to General Mills, Inc., a corporation of Delaware
No Drawing. Filed Jan. 9, 1963, Ser. No. 250,214
18 Claims. (Cl. 260—404.5)

The present invention relates to novel derivatives of polymeric fat acids. More particularly, it relates to polyacids prepared from polymeric fat acids and amino acids. It also relates to the alkyl esters of such acids and to polyamides prepared from the acids or esters.

The polyacid derivatives of my invention have the following idealized, structural formula:

$$R-[CO(NHR'CO)_y OR'']_x$$

where R is the hydrocarbon group of polymeric fat acids, R' is a hydrocarbon group containing from about 1 to about 20 carbon atoms, y is an integer having an average value of from about 1 to about 40, R'' is hydrogen or an aliphatic hydrocarbon radical of from about 1 to about 8 carbon atoms, and x is an integer of 2 to about 4. R is preferably a dimeric fat radical and x is preferably 2. R' may be aliphatic, alicyclic or aromatic and such radicals may contain substituent groups which do not interfere with the preparation of the polyacids. R' is preferably an aliphatic hydrocarbon group.

A wide variety of polymeric fat acids can be used in the preparation of the polyacids of the present invention. The term "polymeric fat acid" refers to a polymerized fat acid. The term "fat acid" as used herein refers to naturally occurring and synthetic monobasic aliphatic acids having hydrocarbon chains of about 8–24 carbon atoms. The term "fat acids," therefore, includes saturated, ethylenically unsaturated and acetylenically unsaturated acids. These acids are generally polymerized by somewhat different techniques, but because of the functional similarity of the polymerization products, they are generally referred to as "polymeric fat acids." The polymeric fat acids usually contain a predominant portion of dimerized fat acids, a smaller quantity of trimerized and higher polymeric fat acids and some residual monomers.

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecenoic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the naturally occurring drying and semi-drying oils. Suitable drying or semi-drying oils include soybean, linseed, tall, tung, perilla, oiticia, cottonseed, corn, sunflower, dehydrated castor oil and the like. Also, the most readily available acids are oleic and linoleic and thus they are preferred starting materials for the preparation of the polymeric fat acids. It is understood that relatively pure dimerized fat acids, trimerized fat acids, and higher polymers of fat acids can be used as well as mixtures thereof. Relatively pure dimerized fat acids, for example, can be obtained from mixtures of the polymeric fat acids by high vacuum distillation or solvent extraction. It is preferred to employ relatively pure dimerized fat acids in the preparation of the compounds of my invention. In this way new diacids or diesters are produced which are particularly useful for preparing substantially linear polymers.

A wide variety of amino acids can also be used in the preparation of the polyacids of the present invention. Representative of such compounds are 6-aminocaproic acid, 7-aminoheptanoic acid, 8-aminooctanoic acid, 10-aminodecanoic acid, 11-aminoundecanoic acid, 9-aminostearic acid, 12-aminostearic acid, 14-aminobehenic acid, p-aminobenzoic acid, p-aminocyclohexanoic acid, norcamphaneominocarboxylic acids and the like. The corresponding cyclic lactams of the aliphatic amino acids can also be used. Preferably, the amino acid reactant contains from about 4 to about 20 carbon atoms. Mixtures of the various amino acid reactants can also be used.

Esters of the polyacids can be prepared by reaction thereof with alcohols, such as aliphatic alcohols of 1 to about 8 carbon atoms. Such esters can also be prepared by reacting the polymeric fat acids with the simple alkyl esters of the above described amino acids—i.e., methyl, butyl or actyl 7-aminoheptanoic acid, for example.

The new polyacid derivatives are prepared by heating the amino acid compound (i.e., amino acid, ester thereof, or cyclic lactam) and the polymeric fat acid(s) under amide forming conditions. Reaction temperatures of about 150° to 300° C. are particularly suitable. It may be desirable to employ a low temperature initially (i.e., 150° C.), such that the reaction can be readily controlled, and then raise the temperature at a later stage to facilitate substantial completion of the reaction. The reaction may also be carried out in the presence of a diluent or solvent. Suitable solvents include phenol, cresols, thymol and diphenyl oxide. After the completion of the reaction, the solvent can be removed such as by evaporation or distillation. The ratios of the reactants will vary according to the particular product desired. For example, where a polyacid of the above-defined formula wherein y is 20 is desired, at least 20 moles of amino acid will be used for each of the carboxylic groups of 1 mole of polymeric fat acid. It is preferred to employ a slight excess of the amino acid over that required to produce the desired polyacid. After completion of the reaction, the excess amino acid and any remaining water can be vacuum distilled from the polyacid.

The following examples serve to illustrate the present invention without, however, limiting the same thereto.

EXAMPLE I

Into a glass reaction vessel equipped with a stirrer, thermocouple and distillation head were charged 150 g.

6-aminocaproic acid and 50 g. distilled dimerized fat acid. The dimerized fat acid was derived from the mixture of acids in tall oil and consisted essentially of a mixture of dimerized linoleic and oleic acids. It had the following properties: wt. percent dimerized fat acid—99; and neutral equivalent— 286. The reaction mixture was heated at 150° C. with stirring for 3.5 hours under a nitrogen atmosphere. The temperature was then increased to 200° C. for 1 hour and finally to 250° C. for 0.5 hour. During the reaction 18.7 g. water was collected. Vacuum (6 mm.) was applied for 1 hour at 250° C. during which time 16.8 g. caprolactam distilled from the reaction vessel. There was obtained a mixture of diacids having the formula:

$$D[CO(NHCH_2CH_2CH_2CH_2CH_2CO)_yOH]_x$$

where $x$ is 2, $y$ is 5.67 and D is the dimeric fat radical derived from the starting dimerized fat acid. The mixture had a neutral equivalent of 957.

EXAMPLES II–VIII

Example I was repeated using different ratios of the dimeric fat acid and 6-aminocaproic acid (Examples II–IV) and a second amino acid, 11-aminoundecanoic acid (Examples V–VIII). The results are set forth in the following table:

*Table*

| Example | Dimerized Fat Acid (g) | Amino Acid | | | Diacid Product | | |
|---|---|---|---|---|---|---|---|
| | | Name | (g) | y | Neut. Equiv. | M.P.[1] °C. | Inh.[2] Visc. |
| II | 40 | 6-aminocaproic | 360 | 18.4 | 2,300 | 182 | 0.33 |
| III | 200 | ___do___ | 275 | 2.39 | 577 | 86 | 0.09 |
| IV | 200 | ___do___ | 200 | 1.64 | 483 | ([3]) | 0.07 |
| V | 100 | 11-aminoundecanoic | 300 | 4.26 | 1,180 | 155 | 0.18 |
| VI | 175 | ___do___ | 248 | 2.08 | 672 | 127 | 0.11 |
| VII | 229 | ___do___ | 242 | 1.50 | 577 | 72 | 0.10 |
| VIII | 215 | ___do___ | 645 | 4.27 | 1,070 | | |

[1] The melting point was determined by the method described in "Preparative Methods of Polymer Chemistry"—Sorenson and Campbell—1961—Interscience Publishers, Inc.—pages 49–50.
[2] Inherent viscosity was determined using a 1% by weight concentration of the diacid in m-cresol at 30° C.
[3] Semisolid.

The above examples show that a variety of polyacids can be prepared according to the present invention. The diacids of Examples II–IV have substantially the same formula as set forth in Example I but wherein $y$ varies from 1.64 to 18.4. The diacids of Examples V–VIII have the following formula:

$$D[CO(NHR'CO)_yOH]_x$$

where $x$ is 2, $y$ is 4.26, 2.08, 1.50, and 4.27, respectively, D is the dimeric fat radical derived from the starting dimerized fat acid, and R' is the polymethylene radical derived from the 11-aminoundecanoic acid.

As indicated above, the present invention also relates to polyamides prepared from the new polyacids and esters. The polyamides are prepared by reacting the polyacids or esters with organic diamines. The diamines have the following general formula:

$$H_2N—R'''—NH_2$$

where R''' is selected from the group consisting of aliphatic and aromatic radicals containing from about 2 to about 20 carbon atoms. Representative of such diamines are:

ethylene diamine
propylene diamine
1,2-diaminobutane
1,3-diaminobutane
trimethylene diamine
tetramethylene diamine
pentamethylene diamine
hexamethylene diamine
decamethylene diamine
dodecamethylene diamine
octadecamethylene diamine
phenylene diamine
metaxylene diamine
paraxylene diamine
cyclohexane diamine
1,4-cyclohexane bis (methylamine)
bis-aminoalkyl ethers Other diamines of the above-described formula may also be used as well as mixtures thereof.

The polyamides are prepared by reacting the polyacid or ester and the diamine under amide forming conditions. Temperatures of from about 120° to 300° C. are preferred. The reaction temperature should not be so high as to cause decomposition of the polyamide. The ratios of the reactants can vary but where linear polyamides of high molecular weight are desired the polyacid or ester and the diamine should be reacted in substantially equimolecular quantities. The polyamides are useful as adhesives, fiber-forming compounds, molding compounds and the like.

The following example illustrates the preparation of the polyamides of the present invention.

EXAMPLE IX

Into a reaction flask were charged 297 g. (0.277 equiv.) of the polyacid of Example VIII and 16.13 g. (0.277 equiv.) of hexamethylene diamine. The reaction mixture was heated to 170° C. and held at that temperature for 15 minutes. The temperature was then raised to 200° C. and held for 30 minutes and again raised to 250° C. and held for 45 minutes. A high vacuum (1 mm. Hg) was applied for a period of 1 hour, during which time the temperature increased to 300° C. There was obtained a polyamide having an inherent viscosity of 1.045 (1% by weight in m-cresol at 30° C.), an amine value of 22 meq./kg. and acid value of 36 meq./kg. A portion of the polyamide was molded to give molded pieces having the following properties (ASTM D–1248–58T): tensile strength—6300 p.s.i., and maximum elongation—260%.

It is to be understood that the invention is not to be limited to the exact details of operation or the exact compositions shown and described, as obvious modifications and equivalents will be apparent to those skilled in the art and the invention is to be limited only by the scope of the appended claims.

The embodiments of the invention in which an exclusive property or privilege is claimed are defined as follows:

1. A compound having the formula:

$$R[CO(NHR'CO)_yOH]_x$$

where R is the hydrocarbon group of polymeric fat acids, said polymeric fat acids having been prepared by polymerizing monobasic aliphatic acids of 8–24 carbon atoms, R' is a divalent hydrocarbon group containing from about 1 to about 20 carbon atoms, y is an integer of from about 1 to about 40 and x is an integer of 2 to about 4.

2. The compound of claim 1 where R' is a divalent aliphatic hydrocarbon group.

3. The compound of claim 1 where R' is a divalent aromatic hydrocarbon group.

4. The compound of claim 1 where R' contains from about 4 to about 20 carbon atoms.

5. A compound having the formula:

$$R[CO(NHR'CO)_yOR'']_x$$

where R is the hydrocarbon group of polymeric fat acids, said polymeric fat acids having been prepared by polymerizing monobasic aliphatic acids of 8–24 carbon atoms, R' is a divalent hydrocarbon group containing from about 1 to about 20 carbon atoms, R'' is an aliphatic hydrocarbon group containing from about 1 to about 8 carbon atoms, y is an integer of from about 1 to about 40 and x is an integer of 2 to about 4.

6. The compound of claim 5 where R' is a divalent aliphatic hydrocarbon group.

7. The compound of claim 6 where R' contains from about 4 to about 20 carbon atoms.

8. The compound of claim 5 where x is 2.

9. A diacid having the formula:

$$D[CO(NHR'CO)_yOH]_2$$

where D is the divalent hydrocarbon group of dimeric fat acids, said dimeric fat acids having been prepared by polymerizing monobasic aliphatic acids of 8–24 carbon atoms, R' is a divalent hydrocarbon containing from about 1 to about 20 carbon atoms and y is an integer of from about 1 to about 40.

10. The diacid of claim 9 where R' is a divalent aliphatic hydrocarbon group containing from about 4 to about 20 carbon atoms.

11. A compound having the formula:

$$D[CO(NHCH_2CH_2CH_2CH_2CH_2CO)_yOH]_2$$

where D is the divalent hydrocarbon group of dimeric fat acids, said dimeric fat acids having been prepared by polymerizing monobasic aliphatic acids of 8–24 carbon atoms and y is an integer of from about 1 to about 40.

12. A polyamide prepared by reacting at temperatures of about 120 to 300° C. substantially equivalent amounts of (1) a compound having the formula:

$$R[CO(NHR'CO)_yOH]_x$$

where R is the hydrocarbon group of polymeric fat acids, said polymeric fat acids having been prepared by polymerizing monobasic aliphatic acids of 8–24 carbon atoms, R' is a divalent hydrocarbon group containing from about 1 to about 20 carbon atoms, y is an integer of about 1 to about 40 and x is an integer of 2 to about 4 and (2) an aliphatic diamine having the formula:

$$H_2N—R'''—NH_2$$

where R''' is a divalent aliphatic group containing from about 2 to about 20 carbon atoms.

13. The polyamide of claim 12 where R' is a divalent aliphatic hydrocarbon group containing from about 4 to about 20 carbon atoms.

14. The polyamide of claim 12 where x is 2.

15. A polyamide prepared by reacting at temperatures of about 120 to 300° C. substantially equivalent amounts of (1) a compound having the formula:

$$R[CO(NHR'CO)_yOH]_x$$

where R is the hydrocarbon group of polymeric fat acids, said polymeric fat acids having been prepared by polymerizing monobasic aliphatic acids of 8–24 carbon atoms, R' is a divalent hydrocarbon group containing from about 1 to about 20 carbon atoms, y is an integer of about 1 to about 40 and x is an integer of 2 to about 4 and (2) an aromatic diamine having the formula:

$$H_2N—R'''—NH_2$$

where R''' is a divalent aromatic group containing from about 6 to about 20 carbon atoms.

16. The polyamide of claim 15 where x is 2.

17. A polyamide prepared by reacting at temperatures of about 120 to 300° C. substantially equivalent amounts of (1) a compound having the formula:

$$R[CO(NHR'CO)_yOR'']_x$$

where R is the hydrocarbon group of polymeric fat acids, said polymeric fat acids having been prepared by polymerizing monobasic aliphatic acids of 8–24 carbon atoms, R' is a divalent hydrocarbon group containing from about 1 to about 20 carbon atoms, R'' is an aliphatic hydrocarbon group containing from about 1 to about 8 carbon atoms, y is an integer of from about 1 to about 40 and x is an integer of 2 to about 4 and (2) an aliphatic diamine having the formula:

$$H_2N—R'''—NH_2$$

where R''' is a divalent aliphatic group containing from about 2 to about 20 carbon atoms.

18. A polyamide prepared by reacting at temperatures of about 120 to 300° C. substantially equivalent amounts of (1) a compound having the formula:

$$R[CO(NHR'CO)_yOR'']_x$$

where R is the hydrocarbon group of polymeric fat acids, said polymeric fat acids having been prepared by polymerizing monobasic aliphatic acids of 8–4 carbon atoms, R' is a divalent hydrocarbon group containing from about 1 to about 20 carbon atoms, R'' is an aliphatic hydrocarbon group containing from about 1 to about 8 carbon atoms, y is an integer of from about 1 to about 40 and x is an integer of 2 to about 4 and (2) an aromatic diamine having the formula:

$$H_2N—R'''—NH_2$$

where R''' is a divalent aromatic group containing from about 6 to about 20 carbon atoms.

References Cited by the Examiner
UNITED STATES PATENTS

| | | | |
|---|---|---|---|
| 2,778,773 | 1/1957 | Wellman | 260—404.5 X |
| 2,956,068 | 10/1960 | Dohr et al. | 260—404.5 |
| 3,091,623 | 5/1963 | Knox et al. | 260—404.5 |

CHARLES B. PARKER, *Primary Examiner.*

JOSEPH P. BRUST, *Assistant Examiner.*